March 6, 1962   J. MÜLLER   3,024,040
FRONT WHEEL SUSPENSION FOR MOTOR VEHICLES
Filed Oct. 21, 1957   3 Sheets-Sheet 1

INVENTOR
JOSEF MÜLLER
BY Dike and Craig
ATTORNEYS

March 6, 1962

J. MÜLLER 3,024,040

FRONT WHEEL SUSPENSION FOR MOTOR VEHICLES

Filed Oct. 21, 1957

INVENTOR
JOSEF MÜLLER

BY

ATTORNEYS

March 6, 1962　　　　J. MÜLLER　　　　3,024,040
FRONT WHEEL SUSPENSION FOR MOTOR VEHICLES
Filed Oct. 21, 1957　　　　　　　　　　3 Sheets-Sheet 3

INVENTOR
JOSEF MÜLLER

BY *Dike and Guy*

ATTORNEYS

United States Patent Office 3,024,040
Patented Mar. 6, 1962

3,024,040
FRONT WHEEL SUSPENSION FOR
MOTOR VEHICLES
Josef Müller, Stuttgart-Riedenberg, Germany, assignor to Daimler-Benz Aktiengesellschaft, Stuttgart-Unterturkheim, Germany
Filed Oct. 21, 1957, Ser. No. 691,445
Claims priority, application Germany Oct. 31, 1956
15 Claims. (Cl. 280—106.5)

The present invention relates to a front wheel suspension for motor vehicles in which the vehicle superstructure, such as the main frame or vehicle body is elastically supported on an auxiliary frame carrying thereon the wheel suspension and wheel spring system.

In the known prior art constructions of such types of wheel suspensions, three bearing places or support points are usually provided, namely two disposed symmetrically with respect to the vehicle longitudinal center plane and one within the vehicle central longitudinal plane at a distance from the straight line passing through the other two points. The former two symmetrically arranged bearing places thereby essentially transfer the vehicle weight to the auxiliary frame, whereas the latter bearing place prevents tilting of the auxiliary frame about an axis extending through the two former bearing places, for example, as may occur during braking of the vehicle.

The present invention consists essentially therein that the main frame or vehicle body rests only at two places on the auxiliary frame, namely on each side of the longitudinal central plane of the vehicle at one bearing place or support point, and that the auxiliary frame is additionally supported, preferably elastically, at the vehicle superstructure, such as at the main frame or vehicle body, by one or several, especially two support members symmetrically arranged with respect to the vehicle central longitudinal plane which extend at a distance from the straight line passing through both symmetrically arranged bearing places of the main frame essentially horizontally and in the vehicle longitudinal direction.

The moment about the axis or straight line passing through the two bearing places is absorbed by the support members so that a third bearing place at a distance from this line as used heretofore may be dispensed with.

Thus, as compared with the known prior art constructions, the front wheel suspension in accordance with the present invention requires considerably less space for the auxiliary frame thereof in the longitudinal direction of the vehicle; the auxiliary frame is thereby appropriately constructed as a cross bearer member having upwardly bent end portions on each side thereof.

Such types of support members permit the bearing or support to be kept relatively soft. The present invention proposes for the construction of such bearings or supports that an annularly shaped rubber buffer or cushion is provided at the bearing places or support points of the main frame on the auxiliary frame between an indented portion of or cavity formed in the auxiliary frame and a correspondingly shaped sheet-metal member which is rigidly connected with the main frame.

According to one embodiment of the present invention, the rubber cushion or block is limited in the vertical direction, on the one hand, by the indentation or recess in the auxiliary frame, and, on the other, by a flange of the sheet-metal member rigidly connected with the main frame.

According to another embodiment in accordance with the present invention, the rubber block or cushion is annularly secured as an adhesive rubber between an indentation or cavity in the auxiliary frame and a sheet-metal member rigidly connected with the main frame and is not limited in the downward direction thereof.

Still another possibility in accordance with the present invention is the arrangement so that an enclosed air-filled bellows is provided at the bearing places or support points of the main frame on the auxiliary frame between an indentation or recess of the auxiliary frame and the main frame, which bellows has a certain predetermined play laterally with respect to the indentation or recess of the auxiliary frame.

A particularly soft bearing or support of the main frame on the auxiliary frame offers the advantage that a transmission of vibrations on the main frame is avoided still more effectively. In such cases, however, the auxiliary frame is not sufficiently guided usually with respect to the main frame.

In addition to the longitudinal guidance of the auxiliary frame which is achieved by means of the longitudinal support members, the present invention proposes, in case of necessity of the particular type vehicle, to use a torsion rod provided as stabilizer for purposes of longitudinal guidance in such a manner that the places where the torsion rod is secured with those parts participating in the wheel hub movements and with the main frame, only exhibit a relatively slight elasticity or yieldingness in the longitudinal direction of the vehicle.

For purposes of transverse guidance, a cross support rod or strut may be provided which extends essentially in the transverse direction of the vehicle, which cross support rod is pivotally connected at the main frame and at the auxiliary frame by the interposition of rubber blocks or cushions.

Accordingly, it is an object of the present invention to provide an arrangement for the support or bearing of the main frame on an auxiliary frame carrying thereon the wheel suspensions and spring system which only necessitates two points or bearing places between the main frame and the auxiliary frame.

It is another object of the present invention to provide an arrangement for the support of the auxiliary frame on the main frame which enables the use of an auxiliary frame of considerably smaller dimension in the longitudinal direction of the vehicle.

Still another object of the present invention resides in the provision of an arrangement which enables the use of an essentially transversely extending auxiliary frame for supporting thereon the vehicle superstructure at only two places and which includes relatively simple support means to absorb any moments which may occur about an axis extending through the two support points or bearing places.

A further object of the present invention is to provide a front wheel suspension by means of an auxiliary frame carrying thereon the front wheel suspension which is simpler in construction, requires less space in the longitudinal direction of the vehicle, and facilitates assembly and disassembly of the preassembled wheel suspension unit.

Another object of the present invention is to provide such an arrangement of an auxiliary frame supporting thereon the main frame or vehicle body which enables a relatively soft bearing or support of the main frame on the auxiliary frame without impairment to sufficient guidance of the auxiliary frame with respect to the main frame.

These and other objects, features and advantages of the present invention will become more obvious from the following description when taken in connection with the accompanying drawing which shows, for purposes of illustration only, three embodiments in accordance with the present invention, and wherein.

Figure 1:
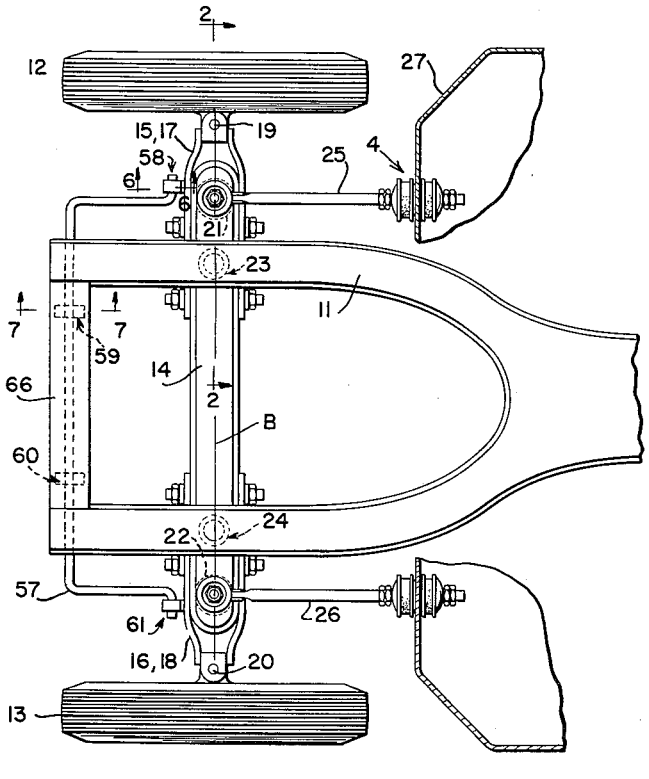
FIGURE 1 is a plan view of a front wheel suspension of a motor vehicle in accordance with the present invention.
Figure 2:
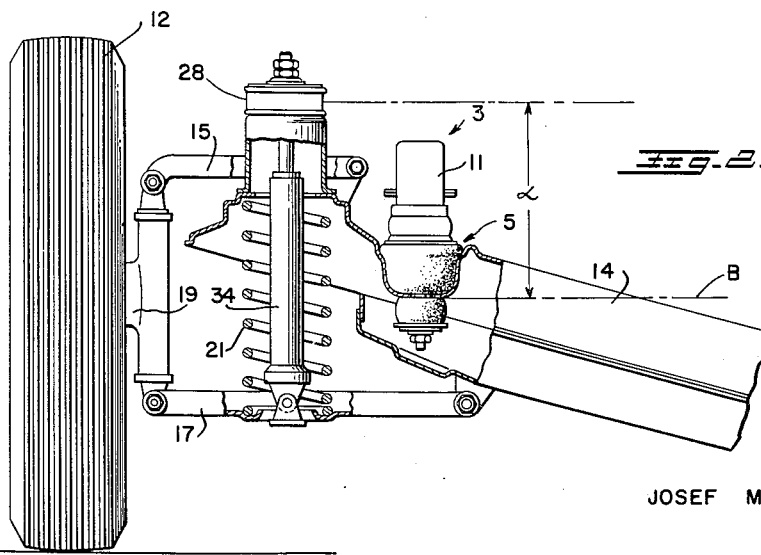
FIGURE 2 is a cross-sectional view of a front wheel suspension in accordance with the present invention taken along line 2—2 of FIGURE 1.

Referring now to the drawing, wherein like reference numerals are used throughout the various views to designate like parts, and more particularly to FIGURES 1 and 2, the support of the vehicle structure, for example, of the main frame 11 of a motor vehicle, on the front wheels 12 and 13, takes place over an auxiliary frame 14 whereby the main frame 11 is elastically supported on the auxiliary frame 14 and the auxiliary frame 14 carries the wheel suspension comprising the upper guide links or arms 15 and 16, the lower guide links or arms 17 and 18, the wheel carriers 19 and 20 and the spring system including the springs, such as coil springs 21 and 22.

According to the present invention, the main frame 11 rests on the auxiliary frame 14 only at two places only schematically illustrated in FIGURE 1 and generally designated therein by reference numerals 23 and 24, and more particularly in one place on each side of the motor vehicle central longitudinal plane. For purposes of absorbing moments about an axis or straight line β extending through the two bearing places 23 and 24 of the main frame 11 on the auxiliary frame 14, as may occur, for example, during braking of the vehicle, the auxiliary frame 14 is additionally supported at the vehicle superstructure, namely at vehicle body portion 27, by means of two support members 25 and 26, preferably elastically, for example, at the front wall 27 of the vehicle, whereby the two support members 25 and 26 extend at a distance α from the straight line passing through the two bearing places 23 and 24 of the main frame 11 on the auxiliary frame 14 essentially horizontally and in the longitudinal direction of the vehicle.

Figure 3:
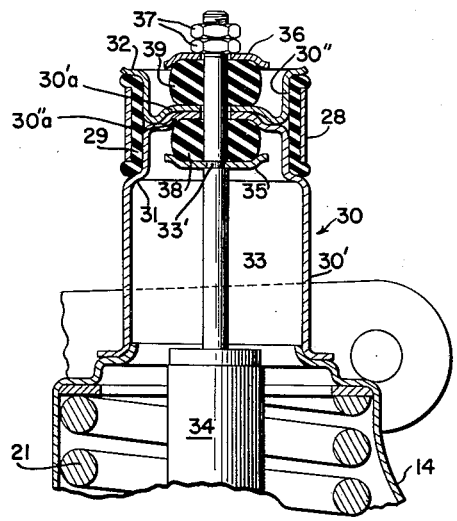
FIGURE 3 is a cross-sectional view, on an enlarged scale, showing the manner of securing a support member at the auxiliary frame, the enlarged details in FIGURE 3 being generally designated in FIGURE 2 by reference numeral 3.
Figure 4:
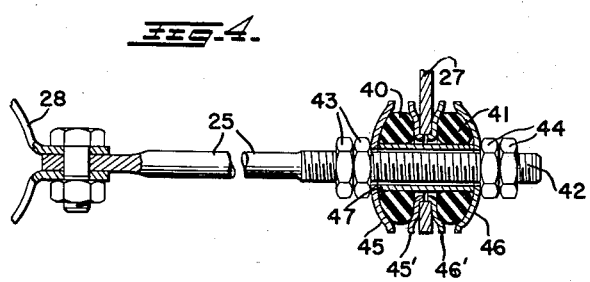
FIGURE 4 is a cross-sectional view, on an enlarged scale, showing the manner of securing the support member at the front wall of the vehicle, the enlarged details shown in FIGURE 4 being generally designated in FIGURE 1 by reference numeral 4.

FIGURES 3 and 4 show in detail the manner of securing one of the two support members 25 and 26 at the auxiliary frame 14 and at the front wall 27 of the vehicle.

The support member 25, which is the one illustrated in connection with FIGURES 3 and 4, and which is identical in all respects with the support member 26, is provided at the end thereof adjacent the auxiliary frame 14 with a clamp 28 (FIGURE 3) which surrounds a cylindrical sheet-metal body, generally designated by reference numeral 30 and rigidly connected with the auxiliary frame 14, by the interposition of an annularly shaped rubber block or buffer 29. The rubber block or cushion 29 is thereby arranged between two collars 31 and 32 of a lower and an upper part 30' and 30", respectively, of the cylindrical sheet-metal body member 30 so that the rubber block 29 is secured thereby in the axial direction. The lower part 30' of the cylindrical sheet-metal body member 30 is suitably secured at the auxiliary frame 14. The upper part 30" is forced against the lower part 30' by means of sheet-metal retainer plates 35 and 36 which are disposed on the piston rod 33 of a shock absorber 34 against the lower part 30'.

The piston rod 33 of the shock absorber 34 thereby extends through the lower and upper parts 30' and 30" of the cylindrical sheet-metal body member 30 and includes within the lower part 30' a sheet-metal retainer plate 35 securely fastened thereon and outside, i.e., above the lower portion 30', a sheet-metal retainer plate 36, which is loosely mounted thereon. The sheet-metal backing or retainer plate 35 may thereby be appropriately secured in a groove 33' provided in the piston rod 33 so as to securely seat the backing plate 35 against movement in the axial direction relative to the piston rod 33. The two sheet-metal plates 35 and 36 are tightly secured by means of the two nut members 37 threadably secured to the upper end of the piston rod 33 by the interposition of annular rubber blocks 38 and 39 against the lower part 30' of the cylindrical sheet-metal body member 30 and thereby simultaneously press the upper part 30" of the cylindrical sheet-metal body 30 against the lower part 30' thereof so that the complementary annular parts 30'a and 30"a, formed integral with parts 30' and 30", respectively, are securely pressed against each other.

It is thus seen that the sheet-metal plate members 35 and 36 and the nut members 37 simultaneously also secure in place the upper removable part 30" of the sheet-metal body 30 since the rubber blocks 38 and 39 are also securely held in place, with proper pre-tensioning, if so desired, by the annular portions 30'a and 30"a of the parts 30' and 30", respectively.

At the other end of the support member 25 (FIGURE 4), the latter extends through the front wall 27 of the vehicle and is supported with respect thereto by the interposition of annular rubber blocks 40 and 41. The portion of the support member 25 extending through the front wall 27 is thereby provided with a threaded portion 42 and carries on each side of the front wall 27 two pairs of nut members 43 and nut members 44 tightened against each other. The rubber block 40 is retained between retainer sheet-metal cups or plates 45 and 45' and the rubber block 41 between retainer sheet-metal plates 46 and 46'.

The longitudinal distance of the front wall 27 with respect to the place where a respective support member 25 and 26 is secured to the auxiliary frame 14 thereby depends on the adjustment and setting of the nut members 43 and 44. Consequently, the effective length of the support members 25 and 26 may be adjustably variable and the caster angle of the wheels may thereby be adjusted in a particularly simple manner.

Figure 5:
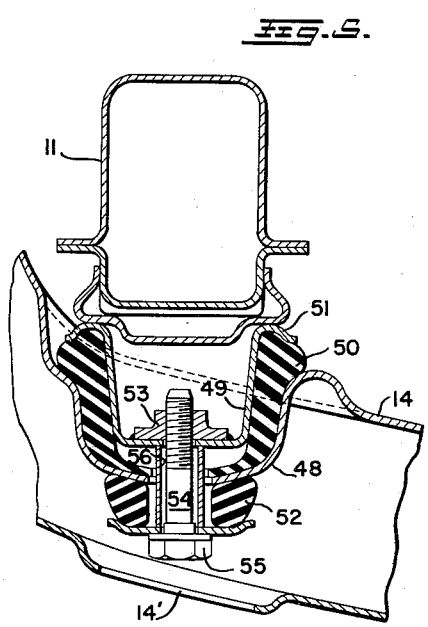
FIGURE 5 is a cross-sectional view of the bearing or support of the main frame on the auxiliary frame of an arrangement according to FIGURE 2, the enlarged details shown in FIGURE 5 being generally designated in FIGURE 2 by reference numeral 5.

FIGURE 5 shows in greater detail one of the two bearing places or support points, generally designated in FIGURE 1 by reference numerals 23 and 24, of the main frame 11 on the auxiliary frame 14.

Whereas the support members 25 and 26 are connected at a distance above the ends of the auxiliary frame 14, the bearing places or support points 23 and 24 of the main frame 11 on the auxiliary frame 14 are disposed lower than the support members 25 and 26 by a distance. The auxiliary frame 14 is thereby bent upwardly at the outer ends thereof and includes furthermore at each of the bearing places 23 and 24 an indented or recessed portion 48 for cooperation with a correspondingly shaped sheet-metal member 49 rigidly connected with the main frame 11.

The larger the distance α between the pivotal connection of the support members 25 and 26 and the bearing places 23 and 24 of the main frame 11 on the auxiliary frame 14, the smaller are the forces transmitted by the support members 25 and 26 for a predetermined moment about the axis extending through the bearing places 23 and 24. Correspondingly, the angles of adjustment of the auxiliary frame 14 with respect to the main frame 11 becomes smaller.

Intermediate the indented portion or recesses 48 in the auxiliary frame 14 and the correspondingly shaped sheet-metal member 49 which is rigidly secured with the main frame 11 is arranged an annularly shaped rubber block 50 which extends primarily in the vertical direction. The annularly shaped rubber block or cushion 50 is retained in the essentially vertical direction, on the one hand, by the recess or indentation 48 formed in the auxiliary frame 14, and, on the other, by a flange 51 formed along the upper edge of the sheet-metal member 49 connected rigidly with the main frame 11. By the use of such a rubber block or cushion 50 having only a relatively slight horizontal dimension or thickness, only a limited elasticity or yieldingness of the auxiliary frame 14 with respect to the main frame 11 in a horizontal direction is provided so that other separate members aside from the support members 25 and 26 may be dispensed with for the guidance of the auxiliary frame 11, especially in the horizontal direction. Simultaneously, however, vibrations in the vertical direction, as occur primarily, are far-reachingly absorbed thereby as another relatively soft annularly shaped rubber cushion or block 52 is provided at the lower side of the part of the auxiliary frame forming the indented portion or recess 48.

The rubber block 52 is forced against the lower side of the part of the auxiliary frame 14 forming the indented portion or recess 48 by means of a bolt 54 extending through the bottom of the indented portion or recess 48 and through the sheet-metal member 49 rigidly connected with the auxiliary frame 11 and threadably secured in a nut-like member or counter-part 53 rigidly connected with the main frame 11 by being suitably secured, for example, welded, to the bottom of the sheet-metal member 49 which, itself, is rigidly connected with the main frame 11. The bolt 54 thereby extends essentially vertically and is provided with a bolt head 55 which may be engaged by means of a suitable tool through an aperture 14' provided in the auxiliary frame.

Thus, the main frame 11 is spring-supported by means of two rubber blocks 50 and 52 with respect to the auxiliary frame 14 whereby the rubber blocks 50 and 52 are disposed above and below the bottom of the recess 48 formed in the auxiliary frame 14.

Both rubber blocks 50 and 52 are under predetermined pre-tension. For purposes of determining the distance between the bolt head 55 of the bolt 54 from the part 53 rigidly connected with the main frame 11 and therewith for determining the pre-tensioning of the rubber blocks 50 and 52, a spacer sleeve 56 is provided which surrounds the bolt 54 between the part 53 and the bolt head 55. The rubber block 52 is not limited in the horizontal direction by any retainer plate or cup-shaped member and serves exclusively for absorbing vertical forces, i.e., does not, therefore, have to transfer or transmit lateral guide forces so that it may be made of very soft material.

Figure 6:
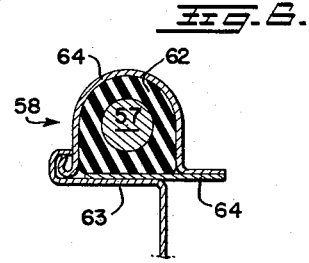
FIGURE 6 is an enlarged cross-sectional view taken along line 6—6 of FIGURE 1 showing the details generally designated by reference numeral 58 of the manner of securing a torsion rod provided as a stabilizer at the wheel suspension.
Figure 7:
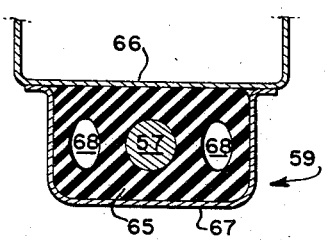
FIGURE 7 is an enlarged cross-sectional view taken along line 7—7 of FIGURE 1 showing the details generally designated by reference numeral 59 of the manner of securing the torsion rod at the main frame.

For purposes of stabilizing the wheel hub movements, a torsion rod 57 is provided which is secured at the lower guide links or arms 17 or 18 and at the main frame 11 in any suitable manner. FIGURES 6 and 7 show in detail one place 58 and 59 each where the torsion rod 57 is secured at the guide link 17 and at the main frame 11, respectively, a corresponding construction being used for the securing places generally designated in FIGURE 1 by reference numerals 60 and 61 and disposed on the other side of the longitudinal central plane which are not shown herein in detail.

At the place of connection 58 (FIGURE 6) where the torsion rod is secured to the guide link 17, the torsion rod 57 is embedded in a rubber block 62 which has only relatively slight resiliency or yieldingness. The rubber block 62 is delimited by a leg portion 63 of the U-shaped lower guide link 17, on the one hand, and by an essentially semi-circular sheet-metal member 64 and a flat member 64', on the other, rigidly connected with the leg portion 63 in any suitable manner.

At the place 59 (FIGURE 7) where the torsion rod 57 is connected at the main frame 11, the rubber block 65 in which the torsion rod 57 is embedded is delimited, on the one hand, by a cross bearer member 66 of the main frame and, on the other, by an essentially U-shaped elongated sheet-metal member 67 secured in any suitable manner, for example, by welding, at the cross bearer member 66. The rubber cushion 65 is thereby provided with apertures 68 extending in the transverse direction of the vehicle so that it is particularly elastic or yielding in the vehicle longitudinal direction.

An elasticity or yieldingness of the torsion rod 57 already exists anyhow in the vehicle transverse direction since the torsion rod is not clamped against the supporting elements thereof in the transverse direction, i.e., is free to undergo at least limited movement relative thereto.

The position of the auxiliary frame 14 is, therefore, not excessively matched with respect to the main frame 11 so that no stressing of the bearing elements 50 can take place. For if the torsion rod 57 were supported or mounted rigidly in the transverse direction at the cross bearer member 66 of the main frame, then the bearing places 59 and 60 would have to be matched accurately with the bearing places 23 and 24 of the auxiliary frame 14 at the main frame 11. If this is not the case, for example, by reason of the improper location of one or several bearing places, then the elastic bearing elements 50 would have to compensate for such improper location or position. As a result thereof, elements 50 are subjected to stresses. In contradistinction thereto, such stressing of elements 50 cannot take place in connection with the bearing arrangement elastic in the transverse direction of torsion rod 57 because any inaccuracies in the arrangement of the bearing places 59 and 60 in relation to bearing places 23 and 24 are absorbed by rubber cushions 65 and are thereby fully compensated for.

Figure 8:
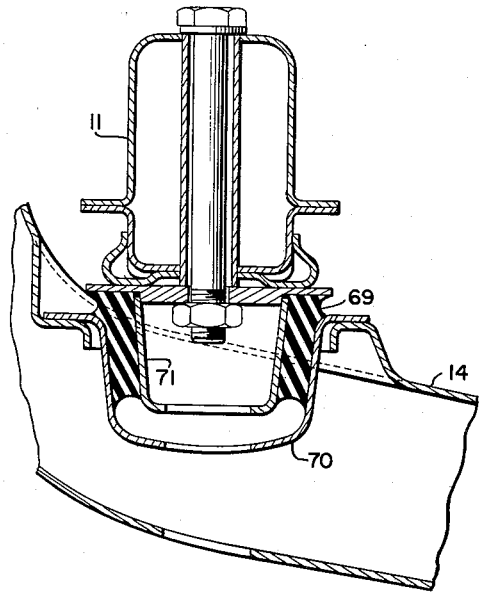
FIGURE 8 is a cross-sectional view, similar to FIGURE 5, of a second embodiment of a bearing or support of the main frame on the auxiliary frame.
Figures 9, 10:
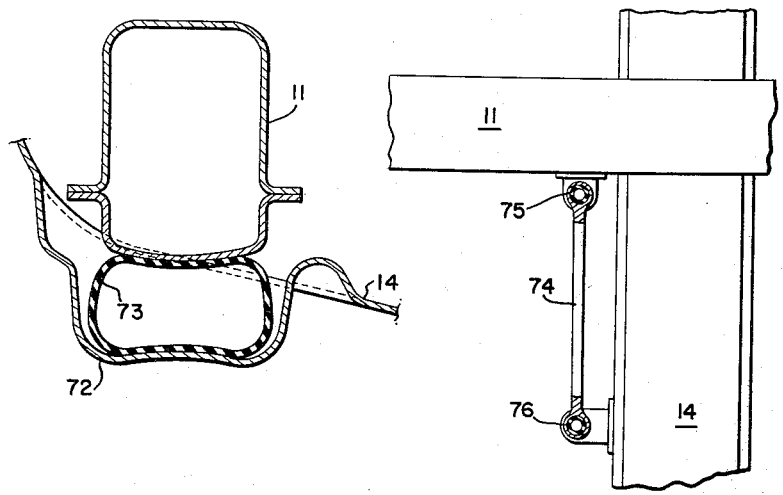
FIGURE 9 is a cross-sectional view, similar to FIGURE 5, of a third embodiment of a bearing or support of the main frame on the auxiliary frame.
FIGURE 10 is a plan view partially in cross section of the arrangement of a cross-support rod member, especially for use in connection with the embodiments of the bearing places according to FIGURES 8 and 9.

In the second and third embodiment, according to FIGURES 8 and 9, the support of the main frame 11 on the auxiliary frame 14 is kept especially soft so that a particularly good damping of vibration and a particularly effective absorption of noises caused by rolling action or rotation of parts is rendered possible.

The embodiment of the support points or bearing places of the second embodiment according to FIGURE 8 distinguishes itself from that of FIGURE 5 in that a soft rubber cushion 69 of annular shape sticks in the manner of adhesive rubber between an indented portion 70 formed by a cup-shaped insert rigidly secured to the auxiliary frame 14 and a cup-shaped sheet-metal member 71 rigidly secured with the main frame 11 whereby the annularly shaped adhesive rubber cushion 69 is not limited in the downward direction, i.e., is not supported in the downward direction by a retainer plate or cup-shaped element.

Such a rubber cushion transmits vertical forces essentially by means of shearing forces rather than by means of compression forces so that with the relatively great softness of the rubber cushion 69 a relatively considerable yieldingness in the vertical direction is obtained. Simultaneously therewith, the yieldingness or elasticity in the horizontal direction also increases by reason of the fact that the rubber 69 may be displaced or deflected downwardly without any hindrance.

A different type of the support of the main frame 11 is shown in the third embodiment according to FIGURE 9 whereby again the two bearing places or support points are similar on both sides of the longitudinal central plane so that the illustration and description of one thereof is believed to suffice.

An indented portion 72 in the auxiliary frame 14 serves to accommodate an enclosed air-filled bellows 73 resting therein which serves as bearing element between the main frame 11 and the auxiliary frame 14 and which has a predetermined play laterally with respect to the indented portion or recess 72.

In the two embodiments according to FIGURES 8 and 9, the auxiliary frame 14, however, is no longer sufficiently guided with respect to the main frame 11 by the bearing arrangements thereof.

The longitudinal guidance of the auxiliary frame 14 is, therefore, taken over, in addition to the guidance provided by the support members 25 and 26, by means of the torsion rod 57. The torsion rod 57 is thereby arranged by the interposition of the rubber cushions, on the one hand, at the guide links 17 and 18 and, on the other, at the main frame 11 in a manner similar to the embodiment of FIGURES 1 to 7, however, the places 58 and 61, as well as the places 59 and 60 where the torsion rod 57 is secured at the guide links, as well as at the main frame, are all constructed in the embodiments according to FIGURES 8 and 9 in a manner corresponding to the securing places 58 and 61 at the guide links, as shown in FIGURE 6. Consequently, all the connections between the torsion rod 57 with the guide links 17 and 18 as well as with the main frame 11, in the embodiment according to FIGURES 8 and 9, which are constructed in a manner similar to FIGURE 6, allow only a relatively slight elasticity or yieldingness in the longitudinal direction of the vehicle.

Thus, in these embodiments of FIGURES 8 and 9, the torsion rod 57 is additionally used in an advantageous manner for purposes of the longitudinal guidance of the auxiliary frame 14.

Furthermore, in such an arrangement, an advantageous stabilizing effect is obtained during braking of the vehicle since the guide link securing places 58 and 61 of the torsion rod 57 move in the opposite direction with respect to the wheel carriers 19 and 20 connected with the corresponding brake drum, and, therefore, counteract the spring movement.

For purposes of cross guidance, a cross-support rod or strut 74 extending esesentially in the transverse direction of the vehicle (FIGURE 10) is provided which is pivotally connected at the main frame 11 and at the auxiliary frame 14 by the interposition of rubber cushions 75 and 76, respectively.

Whereas shocks in a horizontal direction are directly absorbed in the first embodiment essentially at the bearing places 23 and 24 of the main frame 11 on the auxiliary frame 14, these shocks in a horizontal direction are damped in the second and third embodiments of FIGURES 8 and 9, in which the bearings are particularly soft and exhibit a relatively large yieldingness or elasticity in the horizontal direction, essentially by the rubber cushions at the guide elements, i.e., at the support members 25 and 26, the torsion rod 57 and the cross support rod 74.

The term "superstructure" is used herein and in the claims to designate the main frame as well as the body of a vehicle construction of the so-called self-supporting type.

It is thus understood that the term "superstructure" may refer either to the main frame or the vehicle body of the vehicle, depending on the particular construction of the main frame or vehicle body used which forms no part of the present invention.

While I have shown and described several embodiments in accordance with the present invention, it is understood that the present invention is not limited thereto but is susceptible of many changes and modifications within the spirit of the present invention and I intend to cover all such changes and modifications as encompassed by the appended claims.

I claim:

1. A front wheel suspension for motor vehicles comprising a superstructure, an auxiliary frame, independent wheel suspension means supported on said auxiliary frame, means for elastically supporting the weight of said vehicle superstructure on said auxiliary frame in only one place on each side of the central longitudinal plane of the vehicle, and resilient stabilizing support means for stabilizingly securing said auxiliary frame at said vehicle superstructure including two support members each operatively connected to said auxiliary frame and to said vehicle superstructure and extending substantially in the longitudinal direction of the vehicle, the connection of each said support member to said auxiliary frame being in a plane vertically spaced at a distance from the straight line passing through the two first-mentioned support means of said superstructure on said auxiliary frame.

2. A front wheel suspension for motor vehicles comprising a superstructure, an auxiliary frame with wheel suspension means secured thereto, first supporting means for elastically supporting said vehicle superstructure on said auxiliary frame in only one place on each side of the central longitudinal plane of the vehicle, and stabilizing support means for stabilizingly securing said auxiliary frame at said vehicle superstructure including two support members essentially symmetrically arranged with respect to the central longitudinal plane of the vehicle and extending at a distance in the vertical direction from the straight line passing through the two support places of the superstructure on the auxiliary frame essentially in the horizontal and longitudinal direction of the vehicle, first connecting means elastically connecting each support member to a respective side of the auxiliary frame, and second connecting means for elastically connecting the other end of each support member at said vehicle superstructure.

3. A front wheel suspension for motor vehicles comprising a superstructure, an auxiliary frame with wheel suspension means secured thereto, means for elastically supporting said vehicle superstructure on said auxiliary frame at two points lying respectively on opposite sides of the central longitudinal plane of the vehicle, and resilient stabilizing means for stabilizingly securing said auxiliary frame at said superstructure, said resilient stabilizing means including two support members operatively connected to said auxiliary frame and to said superstructure, said support members being arranged substantially laterally of the vehicle and on opposite sides of the central longitudinal plane of the vehicle, each of said support members extending within a plane disposed at a distance in the vertical direction from a line connecting said two points.

4. A front wheel suspension according to claim 3, wherein said means for elastically supporting said vehicle superstructure on said auxiliarly frame comprises two structures, each of said structures comprising a cup-shaped insert secured to said auxiliary frame, a cup-shaped sheet metal member extending into said insert and being rigidly secured to said superstructure, and an adhesive rubber cushion disposed between said insert and said cup-shaped member and being free for downward displacement.

5. A front wheel suspension according to claim 3, wherein said means for elastically supporting said vehicle superstructure comprises two structures, each of said structures comprising an indented portion in said auxiliary frame, upper and lower rubber blocks engaging respectively the inner and the outer walls of said indented portion, sheet metal means connecting said upper block with said vehicle superstructure, means for imparting tension to said rubber blocks, and means for limiting the amount of said tension, said lower rubber block being softer than said upper rubber block.

6. A front wheel suspension according to claim 3, wherein said means for elastically supporting said vehicle superstructure comprises two structures, each of said structures comprising an indented portion in said auxiliary frame, an enclosed rubber air-filled bellows secured in said indented portion, means securing said bellows to said vehicle superstructure, said bellows having a predetermined play in the lateral direction.

7. A front wheel suspension for motor vehicles according to claim 3, wherein said means for elastically supporting said vehicle superstructure has only a slight yielding in the longitudinal direction of the vehicle, and wherein stabilizer means are provided in the form of a torsion rod, resilient means including rubber blocks for elastically supporting said stabilizer means at said wheel suspension means and at said superstructure, at least one of the rubber blocks supporting said stabilizer means at said superstructure being provided with means permitting yielding in the longitudinal direction of the vehicle, said means comprising apertures extending in the transverse direction of the vehicle.

8. A front wheel suspension for motor vehicles according to claim 3, wherein said means for elastically supporting said vehicle superstructure has relatively great resilience in the longitudinal direction of the vehicle, further comprising stabilizer means, said stabilizer means including a torsion rod, means mounting said torsion rod at said wheel suspension means and at said superstructure, said mounting means comprising rubber blocks, said rubber blocks having only a relatively slight degree of yieldability in the longitudinal direction of the vehicle.

9. A front wheel suspension for motor vehicles according to claim 3, wherein said means for elastically supporting said vehicle superstructure has relatively great resilience in the transverse direction of the motor vehicle, further including bracing means extending transversely of the motor vehicle and means elastically connecting said bracing means to said auxiliary frame and to said superstructure.

10. A front wheel suspension for motor vehicles according to claim 3, further including connecting means elastically connecting one end of each said support member to a respective side of the vehicle auxiliary frame.

11. A front wheel suspension according to claim 10 wherein said auxiliary frame is a cross bearer member having upwardly bent ends, and wherein said connecting means includes a cylindrical sheet metal member mounted on each of said ends, each of said sheet metal members carrying a resilient member and two spaced collars, said resilient member being disposed between said collars, clamp means surrounding each said resilient member, one each of said two support members being connected to one each of said clamp means.

12. A front wheel suspension for motor vehicles having a pair of oppositely-disposed front wheels comprising a superstructure, an auxiliary frame, independent suspension means for said front wheels supported on said auxiliary frame, means for elastically supporting the weight of said vehicle superstructure on said auxiliary frame in only one place on each side of the central longitudinal plane of the vehicle, and resilient stabilizing support means secured between said superstructure and said auxiliary frame for stabilizingly securing said auxiliary frame at said superstructure, said stabilizing means being constructed and arranged to absorb moments about the straight line passing through the two places on said auxiliary frame whereon said first-mentioned support means supports said superstructure and comprising two separate support members arranged on opposite sides of the central longtiudinal plane of the vehicle and extending substantially in the longitudinal direction of the vehicle in a plane vertically offset at a distance from said straight line to thereby effectively absorb bending moments about said line.

13. A front wheel suspension for motor vehicles according to claim 12 wherein said superstructure includes a main frame and a vehicle body, wherein said elastic supporting means supports said main frame on said auxiliary frame, and wherein said resilient stabilizing support means secures said auxiliary frame to said vehicle body.

14. A front wheel suspension for motor vehicles according to claim 12, wherein said resilient stabilizing support means are disposed above said elastic supporting means.

15. A front wheel suspension according to claim 12, wherein said support members are adjustable in length to adjust the caster angle of the respective wheels supported on said auxiliary frame.

References Cited in the file of this patent

UNITED STATES PATENTS

| | | |
|---|---|---|
| 2,155,867 | McIntyre | Apr. 25, 1939 |
| 2,228,107 | Best | Jan. 7, 1941 |
| 2,611,627 | Reynolds | Sept. 23, 1952 |
| 2,633,203 | Paton | Mar. 31, 1953 |
| 2,708,003 | Nallinger | May 10, 1955 |
| 2,738,985 | Paton | Mar. 20, 1956 |
| 2,757,016 | Adloff | July 31, 1956 |
| 2,806,714 | Scherenberg | Sept. 17, 1957 |

FOREIGN PATENTS

| | | |
|---|---|---|
| 1,085,174 | France | July 21, 1954 |